Patented Apr. 25, 1939

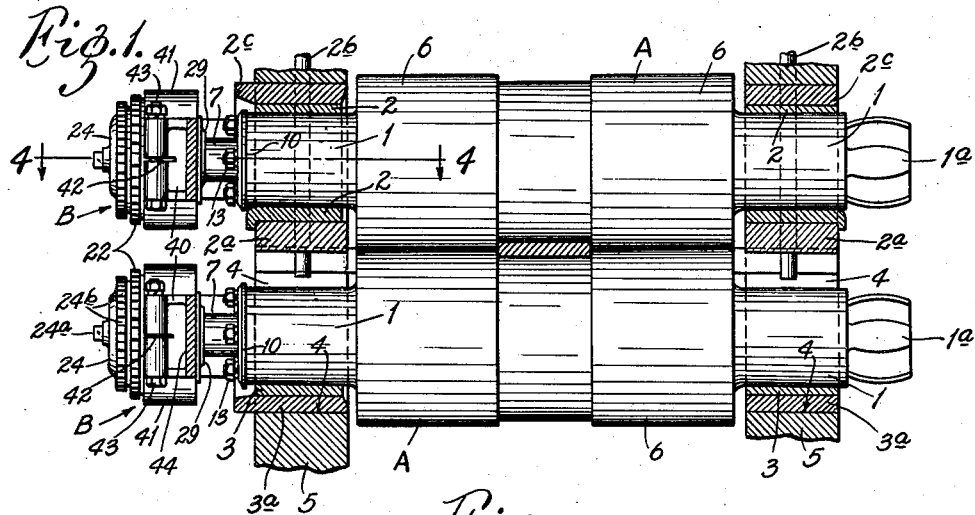

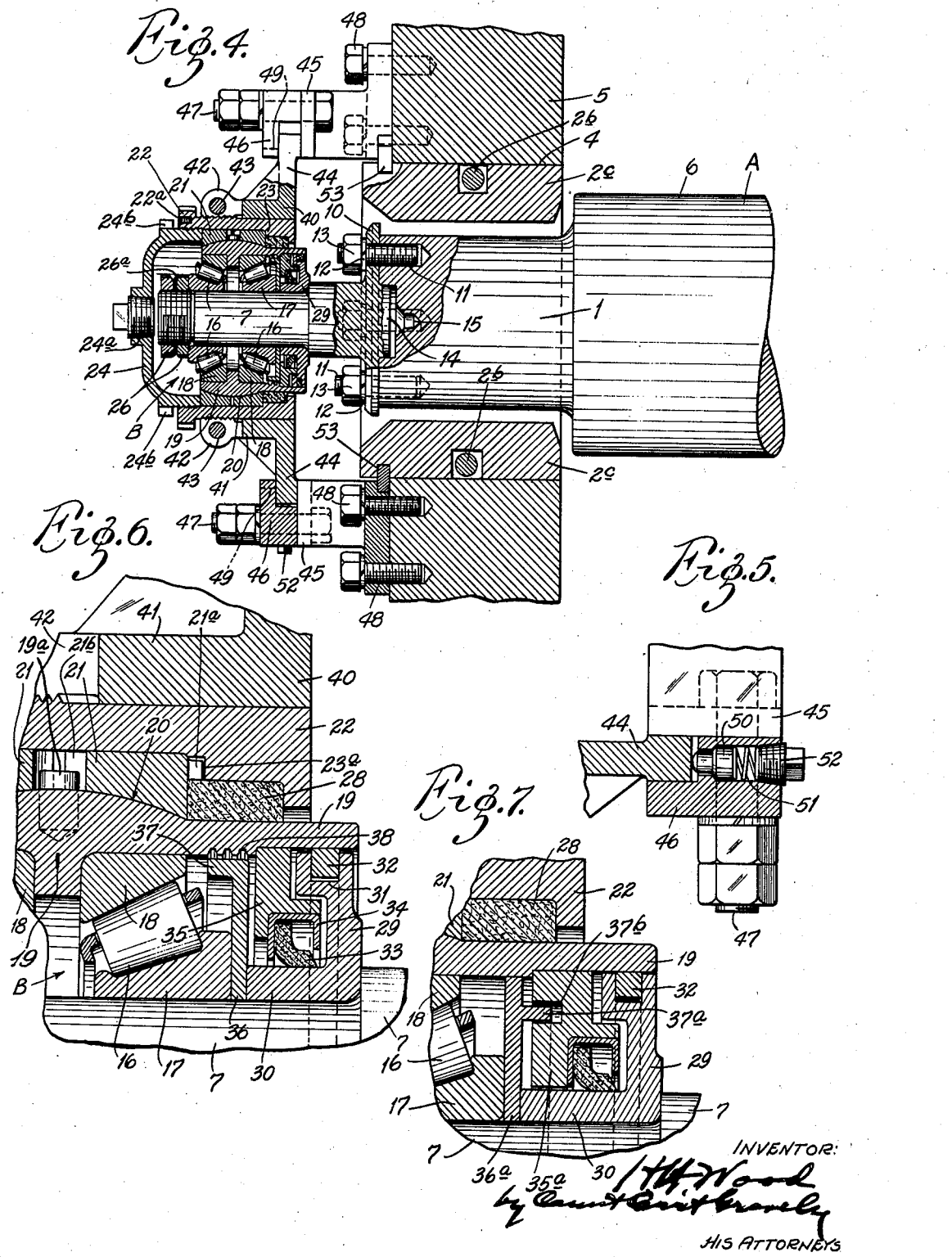

2,155,747

UNITED STATES PATENT OFFICE 2,155,747

ROLLING MILL

Henry H. Wood, Canton, Ohio, assignor to The Timken Roller Bearing Company, Canton, Ohio, a corporation of Ohio Application November 15, 1933, Serial No. 698,103

9 Claims. (Cl. 80—56)

This invention relates to rolling mills of the kind having plain bearings for supporting the rolls. The principal objects of the invention are to provide such rolls with a roller bearing construction that will take care of axial load on the roll to best advantage, that can be readily mounted on and dismounted from the mill without disturbing the roll or disassembling the bearing, that will provide for accurate adjustment of the bearing, that will accommodate itself to misalinement of the roll, that will provide for axial adjustment of the roll, and that will employ other advantages hereinafter appearing. The invention consists in the roller bearing mill roll construction and in the construction, combinations and arrangements of parts hereinafter described and claimed.

In the accompanying drawings, which form part of this specification and wherein like symbols refer to like parts wherever they occur:

Fig. 1 is a vertical view partly in section of a portion of a rolling mill embodying my invention, the section being taken along the line 1—1 in Fig. 2, Fig. 2 is a side view of such portion of said rolling mill, Fig. 3 is a vertical longitudinal section on the line 3—3 in Fig. 2

Fig. 4 is a horizontal section on the line 4—4 in Fig. 2,

Fig. 5 is a detail horizontal section on the line 5—5 in Fig. 2,

Fig. 6 is an enlarged fragmentary detail of the bearing support in the region of the oil closure; and Fig. 7 is a view similar to Fig. 6 showing the modified form of oil closure.

The rolling mill, of which only a portion is shown, comprises a pair of shafts or working rolls A, arranged one above the other with the necks 1 at the corresponding ends of said rolls journaled in the usual plain upper and lower bearings 2 and 3 located in windows 4 provided therefor in the usual roll stands or end members 5 of the framework of the mill. Each top roll bearing 2 comprises a lower section, which seats in a cross bar 2a attached to the lower ends of rods 2b that depend from the top of the window 4, and an upper or rider section seated in a block 2c located thereabove. Each bottom roll bearing 3 engages the lower portion only of the roll neck and is seated in a block 3a that rests on the sill of the window 4. At one end of the rolls, the necks 1 extend beyond the supporting bearings therefor and are provided with wabbler teeth 1a adapted for cooperation with the usual wabbler drive member (not shown). The rolling mill construction thus far described is well known and it is considered unnecessary to illustrate it in detail.

The plain roll neck bearings 2 and 3 are spaced from the ends of the barrels 6 of the rolls so that said bearings are subjected to radial load only. Axial or end thrust loads are taken care of by separate end thrust bearings B (hereinafter described) mounted on spindles 7 that extend beyond the plain bearings at the ends of said rolls remote from the wabbler drive ends thereof. The spindles 7 preferably comprise separate members with flanged inner ends 10, which are rigidly secured to the end of the roll necks by means of studs 11, lock washers 12 and nuts 13, and have a pilot 14 that fits within an axial counterbore provided therefor in the outer end of a lathe center 15 of the roll.

The end thrust bearing B for each roll is a self-alining taper roller bearing comprising two circular series of conical bearing rollers 16 interposed between conical inner raceway members 17 mounted on the spindle portion 7 of said roll and conical bearing cups 18 mounted in a sleeve or tubular shell 19 having an interior annular rib disposed between said cups. The cup supporting sleeve 19 has its outer surface curved lengthwise to form a convex spherical portion 20 which seats in a self-alining concave spherical seat formed by the longitudinally curved inner surfaces of two bronze bushings 21. The bushings 21 are seated within a cylindrical housing or cartridge 22 between an annular shoulder 23 near the inner end thereof and a cap 24, which is threaded into the outer end of said cartridge. The innermost bushing 21 is provided at its inner end with a projection 21a which seats in a recess 23a provided therefor in the shoulder 23 near the inner end of the cartridge 22. A pin 19a projects radially from the spherical face 20 of the sleeve 19 into registering notches 21b in the opposing ends of the two bushings 21 and serves to limit tilting of said sleeve in said bushings and to prevent rotation of the outer bushing in said sleeve. The cap 24 serves to close the outer end of the cartridge 22 and is provided with a plugged opening 24a through which lubricant may be admitted. The threaded closure cap 24 abuts against the outermost bushing 21 and thus serves as a means for taking up wear in the spherical seat formed by said bushings. The cartridge 22 is provided at its outer end with a circular series of holes 22a; and the cap 24 is provided opposite said holes with a circular series of notches 24b of a number and spacing different from the number and spacing of the holes 22a. With this arrangement, one of the notches 24b is brought into register with one of the holes 22a in almost any position of adjustment of the cap 24, which is then locked in the desired position of adjustment by a screw 25 that is threaded into the hole with its head seated in the notch in register therewith. The bearing is adjusted by means of nuts 26 threaded on the outer end of the roll spindle 7 with the inner nut in abutting relation to the outer end of the outermost bearing cone. These nuts are locked together and to the roll spindle by means of a keyed lock washer 26a.

Lubricant is prevented from escaping through the annular space between the inner ends of the shell and cartridge by means of a suitable flexible packing 28. Escape of lubricant through the annular space between the roll spindle 7 and the inner end of the bearing containing sleeve 19 is prevented by means of a suitable closure device. As shown in Fig. 6, said closure device comprises an annular closure plate 29 having an elongated hub portion 30, which is sleeved on the spindle 7 between a shoulder thereon and the innermost bearing cone, and a peripheral groove 31 adapted to receive a piston ring 32, which engages the inner periphery of the sleeve 19. A second oil seal 33 surrounds the hub 30 of the closure plate 29 and is mounted in a channel 34 provided therefor in an annular plate 35 mounted in the sleeve 19 inwardly of said closure plate. An annular baffle plate 36 is interposed between the innermost bearing cone and the hub 30 of the closure plate 29 and has a peripheral flange 37 located opposite annular grooves 38 in the inner periphery of the sleeve 19. The groove 38 and baffle plate 36 tend to prevent lubricant from reaching the sealing rings 32 and 33. Fig. 7 illustrates a slightly modified form of end closure device wherein the baffle plate 36a is provided with an annular flange 37a that fits within an annular groove 37b provided therefor in the annular plate 35a which supports the sealing ring 33.

The cartridge 22 is mounted in a bracket 40 adapted to slide vertically on the roll stand. Said bracket comprises a central main body portion 41 provided with a cylindrical opening adapted to receive the cylindrical cartridge 22, which is threaded into said opening so as to be adjusted axially thereof. The hollow cylindrical portion 41 of the cartridge receiving bracket 40 is slit longitudinally as at 42 and is clamped firmly about the cartridge to hold the cartridge in the desired position of axial adjustment by means of clamping bolts 43. The bracket 40 is provided with arms 44 that extend horizontally on opposite sides of the cylindrical main body portion 41 thereof and are slidably supported at their outer ends in vertical slideways provided therefor on opposite sides of the window 4 in the roll stand. Each of these slideways comprises vertically disposed plates 45, 46 that are secured together flatwise along their outer margins by bolts 47 and are spaced apart along their inner margins to form the slideways. The inner guide plate 45 is provided with a base or foot flange that is secured flatwise to the vertical face of the roll stand by means of bolts 48. The bolt receiving openings in the outer guide plate 46 are in the form of horizontally elongated slots 49, which permit said guide plate to be retracted when the bracket 40 and the roll assembly therein is removed axially from the roll spindle 7.

The slideway for one of the arms 44 of the bracket 40 is provided with spring-pressed plungers 50 for yieldably holding said bracket against rotation and for permitting said bracket to shift horizontally and thus prevent the thrust bearing from taking radial load. As shown in the drawings, the spring pressed plungers 50 are arranged one above and the other below the axis of the bearing. Each plunger is mounted in an opening provided therefor in the outer guide plate 46, and is yieldably held in engagement with the vertical end face of the arm 44 of the brackets 40 by means of a coil spring 51 mounted in said opening between said plunger and a plug 52 threaded into said opening. Axial movement of the plain bearing in the window 4 of the roll stand 5 is prevented by means of keys 53 which seat in opposed vertical grooves provided therefor in the adjacent faces of the plain bearing support and the plates 45 that form the inner walls of the slideways for the bracket 40.

By the arrangement described, the entire end thrust of the roll is taken by the taper double roller bearing B, while the radial load is taken by the plain bearing. The roller thrust bearing B is self-alining due to the spherical joint between the bearing containing sleeve 19 and the supporting bushings 21 therefor and is thus adapted to accommodate itself to canting or cocking of the roll. The threaded engagement between the cartridge 22 and the bracket 40 permits the entire roll to be adjusted axially to maintain proper alinement of the passes. The slidable mounting of said bracket on the roll stand permits the thrust bearing B to float with the roll and accommodate itself to any adjustment or misalinement thereof; and it also prevents any radial load from being transmitted to said bearing. The spring-pressed plungers 50 resist rotation of the bracket 40 without interfering with the floating movement thereof. The removable cap 24 for the oil-tight bearing receiving cartridge 22 serves to hold the bushings 21 in proper engagement with the spherical surface of the sleeve 19, and it also permits ready access to be had to the bearing adjusting nuts 26. The threaded engagement of the cap 24 in the bearing receiving cartridge provides a fine adjustment of the bushings 21 to take up wear in the spherical seat formed thereby; while the different spacing of the holes 22a in the cartridge 22 and the series of notches 24b in said cap enable the latter to be locked in the desired position by the lock screw 25 with the registering notch and hole of the two series. Inasmuch as the spindle 7 and the bracket 40 are removably secured in place, these members, together with the substantially oil-tight cartridge 22 and bearing therein, may be readily attached and removed from the mill as a unit without affecting the bearing adjustment and without exposing the bearing to dirt, grit or water.

What I claim is:

1. A rolling mill comprising a framework, a roll, a radial bearing for said roll mounted to slide vertically on said framework, a taper roller thrust bearing for said roll, and a separate housing for said taper roller thrust bearing mounted on said framework for free sliding movement in all directions transversely of the roll axis, said thrust bearing preventing axial movement of said roll due to end thrust.

2. A rolling mill comprising a framework, a roll, a radial bearing for said roll mounted to slide vertically on said framework, said radial bearing permitting axial sliding movement of said roll therein, a taper roller end thrust bearing for said roll, means for preventing relative axial movement of said roll and said end thrust bearing, a cartridge containing said end thrust bearing, a support for said cartridge mounted on said framework for sliding movement in all directions transversely of the roll axis, and means for adjusting said cartridge axially in said support.

3. A rolling mill comprising a framework, a roll, a radial bearing for said roll mounted to slide vertically on said framework, said radial bearing permitting axial sliding movement of said roll therein, and a taper roller end thrust bearing for said roll, means for preventing relative axial movement of said roll and said end thrust bearing, a cartridge containing said end thrust bearing, a support for said cartridge mounted on said framework for sliding movement transversely of the roll axis, means for adjusting said cartridge axially in said support, and means for yieldably resisting rotary movement of said support.

4. A rolling mill comprising a framework, a roll, a radial bearing for rotatably and slidably supporting said roll, said bearing being mounted on said framework for vertical sliding movement, means for preventing axial movement of said bearing in said framework, a taper roller end thrust bearing for said roll, a supporting sleeve for said end thrust bearing, a cartridge for supporting said sleeve, and a bracket for supporting said cartridge mounted on said framework for movement in all directions transversely of the roll axis.

5. A rolling mill comprising a framework, a roll, a vertically movable bearing for said roll, a bracket mounted on said framework for movement in all directions transversely of the roll axis, a cartridge removably mounted and axially adjustable in said bracket, a sleeve removably mounted in said cartridge, and a self-alining taper roller end thrust bearing for said roll mounted in said sleeve.

6. A rolling mill comprising a framework, a bearing mounted therein, a roll journaled in said bearing, a bracket mounted on said framework for sliding movement thereon transversely of the roll axis, spring-pressed plungers cooperating with said bracket for yieldably resisting rotation thereof, a cartridge threaded into said bracket, a cap threaded into the outer end of said cartridge, bushings mounted in said cap and having concave spherical inner peripheries, a sleeve mounted in said cartridge and having a convex spherical external surface seated in the concave spherical surfaces of said bushings, a roller bearing mounted in said sleeve, and a spindle journaled in said roller bearing and removably secured to said roll.

7. A rolling mill comprising a roll stand having a window therein, a radial bearing adapted to slide vertically in said window, a roll having a neck portion rotatable and axially slidable in said bearing, vertical slideways removably secured to said roll stand on opposite sides of said window, a bracket having oppositely extending arms slidable in said slideways, a cartridge threaded into said bracket opposite the roll neck, a roller thrust bearing mounted in said cartridge, and a spindle journaled in said roller thrust bearing and removably secured to the end of the roll neck.

8. A rolling mill comprising a roll stand having a window therein, a radial bearing adapted to slide vertically in said window, a roll having a neck portion rotatable and axially slidable in said bearing, vertical slideways removably secured to said roll stand on opposite sides of said window, a bracket having oppositely extending arms slidable in said slideways, a cartridge threaded into said bracket opposite the rollneck, a roller thrust bearing mounted in said cartridge, and a spindle journaled in said roller thrust bearing and removably secured to the end of the rollneck, said cartridge having an opening in its outer end through which access may be had to said thrust bearing, a cap for closing said opening, and spring-pressed plungers mounted in one of said slideways and bearing against the end of the bracket arm cooperating therein.

9. A bearing mounting, especially for rolling mills and the like, having a roll mounted in a frame and formed with roll necks, a bearing housing surrounding each of said necks, there being radial bearings within the housings and supporting the roll necks of a type permitting axial adjustment of the roll necks, means on the frame for engaging the housing, the roll being extended outwardly beyond one of the bearings and forming a bearing seat and a self aligning thrust bearing mounted upon the bearing seat, a separate housing supporting such bearing for taking up thrust, the housing being provided with guide ways substantially perpendicular to the axis of the roll, and guiding members freely movable on said guides and secured to the frame whereby the thrust bearing is movable in a direction substantially perpendicular to the axis of the roll but prevents axial movement of said roll due to end thrust, and means for applying pressure to the radial bearings for permitting movement of the rolls in the general plane of the said guideways.

HENRY H. WOOD.